United States Patent [19]
Church

[11] Patent Number: 5,375,902
[45] Date of Patent: Dec. 27, 1994

[54] FOLDABLE MOBILE CAMPER

[76] Inventor: James T. Church, 2331 Dz Avenue S. #128, Palmdale, Calif. 93550

[21] Appl. No.: 106,991

[22] Filed: Aug. 17, 1993

[51] Int. Cl.$^5$ ............................................. B60P 3/355
[52] U.S. Cl. ..................................... 296/169; 296/173
[58] Field of Search ................. 296/26, 168, 169, 173, 296/174; 135/88

[56] References Cited
U.S. PATENT DOCUMENTS

| | | | |
|---|---|---|---|
| 3,256,032 | 6/1966 | Jackson, Jr. | 296/169 |
| 3,703,311 | 11/1972 | Davis | 135/88 X |
| 3,712,316 | 1/1973 | Leonard | 135/88 |
| 4,014,586 | 3/1977 | Swofford | 296/169 |
| 4,088,363 | 5/1978 | Palmer | 135/88 X |
| 4,585,020 | 4/1986 | Masuda et al. | 135/88 X |

FOREIGN PATENT DOCUMENTS

| | | | |
|---|---|---|---|
| 218935 | 11/1958 | Australia | 296/169 |
| 498162 | 1/1939 | United Kingdom | 296/173 |

Primary Examiner—Dennis H. Pedder
Attorney, Agent, or Firm—Roger A. Marrs

[57] ABSTRACT

A trailer intended to be drawn by a motor vehicle is disclosed herein having a wheeled body with a bottom and a continuous sidewall defining an internal storage cavity closeable by a hinged lid. The external side of the lid carries a storage rack while the internal side attaches with one-half of a folding tent-like structure. The other half of the tent-like structure is secured to the peripheral edge of the body sidewall and rigid support rods are pivotally carried on the hinge line of the lid so that when the lid is raised, the tent-like structure is deployed into a fully extended operative position. A mattress is secured to the lid interior by straps.

1 Claim, 2 Drawing Sheets

FOLDABLE MOBILE CAMPER

BACKGROUND OF THE INVENTION

1. Field of the Invention

The present invention relates to the field of off-the-road camper vehicles, and more particularly to a novel wheeled trailer having a foldable or collapsible tent apparatus thereon that may be drawn by a motor vehicle over rough terrain or the like.

2. Brief Description of the Prior Art

In the past, it has been the conventional practice to employ recreational vehicles and accessories which are intended to travel over rough terrain or off-the-road conditions so that at the arrival at a campsite, the vehicle may be used for sleeping, living or storage purposes. In some instances, it is desirable to use a trailer which has a storage compartment into which a variety of camping equipment can be placed. This apparatus is cumbersome and is not always suited for rough terrain travel and usually requires extensive unloading and tent setup procedures.

Some attempts have been made to provide off-road camping facilities which include motor vehicle drawn trailers that have a tent structure adapted to be raised and lowered in a vertical manner. Such camping facilities do not permit added storage within the trailer and require a separate lid or cover which is either integral with the tent structure or which is completely removable from the trailer when the tent structure is raised. In other instances, a foldable structure connects the roof of the vehicle with its body and permits raising of the roof with respect to the body where it is subsequently supported so that the height of the vehicle body is increased permitting a person to stand inside the vehicle at the campsite.

Problems and difficulties have been encountered when employing such conventional camping apparatus, which stem largely from the fact that the trailer or vehicle itself is not suited for travel over rough terrain and such tent structures are awkward to deploy into a raised position and similarly awkward to lower into a storage condition. Such deployment of the tent structure sometimes requires semi-skilled personnel and many times requires more than one person to assist.

Therefore, a long-standing need has existed to provide a convenient and simple means for raising and lowering a tent structure with respect to a wheeled trailer on which the structure is carried. Such a trailer must provide storage capability for camping or recreational accessories and provide a means for access into the storage area even when the tent structure is fully deployed.

SUMMARY OF THE INVENTION

Accordingly, the above problems and difficulties are avoided by the present invention which provides a novel foldable mobile camper that includes a trailer intended to be drawn by a motor vehicle which incorporates a wheeled body having a continuous sidewall integrally formed with a floor or bottom so as to define an internal storage cavity closeable by a hinged cover or lid. The external side of the lid carries a storage rack while the internal side attaches with one-half of a folding tent-like structure and further includes a mattress having two halves. The other half of the tent-like structure is secured to the peripheral edge of the body sidewall. Rigid support rods are pivotally carried on the hinge line of the lid so that when the lid is raised, the tent-like structure is deployed into a fully extended operative position and the mattress halves are laid adjacent to one another to form an elongated mattress. The storage cavity is beneath the mattress half and the mattress half supported by the body includes a removable hatch providing access to the storage cavity. The hatch is within the tent-like structure when it is in its operative position. When the tent-like structure is in its non-operative position, access to storage may be had when the lid is partially raised to about 45° so that access is gained to the cavity.

Therefore, it is among the primary objects of the present invention to provide a novel trailer which is adapted to be towed behind a modified motor vehicle over rough trails without any damage or problems so that upon reaching a campsite, a tent-like structure may be deployed into an operative and usable position.

Another object of the present invention is to provide a novel trailer having a foldable tent-like structure deployed between a storage position and an operative position with ease by one person and wherein the structure is fixedly secured to both a trailer body and a pivoting hinged lid.

Yet another object of the present invention is to provide a novel foldable mobile camper including a deployable tent-like structure between an operative and non-operative positions wherein the trailer provides off-road capability and features which may use special torsional axle features matched with the towing vehicle.

Still a further object of the present invention is to provide a novel foldable mobile camper which has a wheeled body supporting a tent-like structure deployable between a non-operative stowed position and an operative raised position wherein the lid or cover for the wheeled body supports half the structure and the sidewalls of the wheeled body support the other half.

A further object of the present invention resides in the provision of a deployable tent-like structure having a divided mattress partially carried on a pivoting lid for a wheeled body and where the other portion of the structure is supported on the wheeled body and wherein a removable hatch is provided in the mattress for gaining access to the storage compartment within the wheeled body when the tent-like structure is in its raised or deployed operative position.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
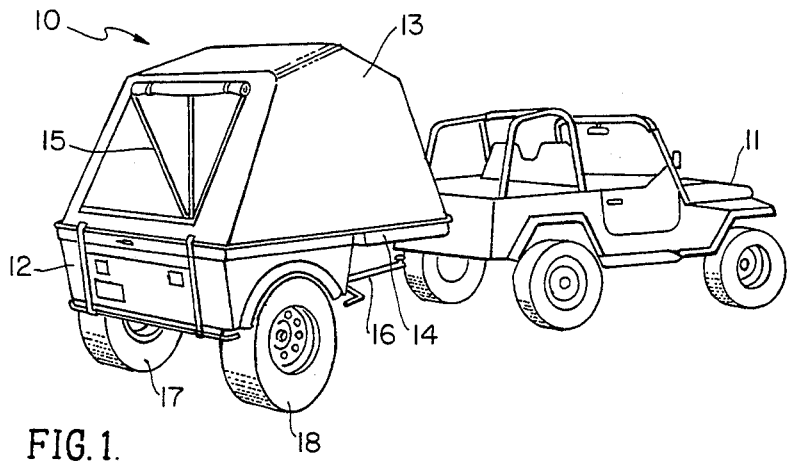
FIG. 1 is a front perspective view showing the foldable mobile camper incorporating the present invention with the tent-like structure in its deployed operative position on the wheeled body.

Referring to FIG. 1, the novel foldable mobile camper of the present invention is illustrated in the general direction of arrow 10 and it is to be noted that the camper is being towed by a recreational vehicle, indicated by numeral 11. Although a vehicle of the "Jeep" type is illustrated, it is to be understood that other towing vehicles may be employed. The camper includes a wheeled body 12 having a tent-like structure 13 illustrated in its fully deployed and operable position. It can be seen that half of the base of the structure is attached to and carried along the upper edge of a continuous sidewall of the wheeled body 12, while the other half of the tent-like structure is supported on a lid 14 hingeably connected to the body 12. The tent-like structure 13 is supported in its deployed operative position by means of rigid rods, such as rod 15. The wheeled body 12 is detachably connected to the vehicle 11 by means of a tow rod 16 and the wheels are indicated by numerals 17 and 18 respectively.

Figure 2:
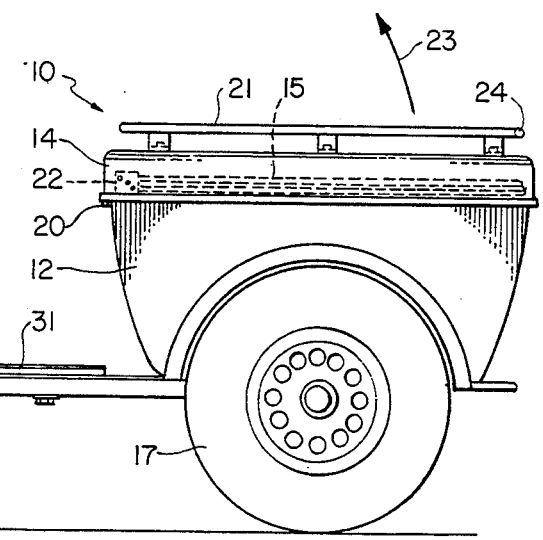
FIG. 2 is an enlarged side elevational view of the foldable mobile carrier illustrating the tent-like structure in its folded and non-operative stowed position.

Referring now in detail to FIG. 2, the mobile camper of the present invention illustrates that the body 12 is defined by a continuous sidewall carried on a bottom so as to define a storage compartment within an internal cavity of the wheeled body 12. The cover or lid 14 is hinged to the upper edge of the sidewall by means of hinge 20 and when in the closed position shown in FIG. 2, the exterior surface of the lid or cover 14 includes a storage rack 21 on which luggage, supplies or the like may be detachably connected with straps or the like. It is also to be understood that the continuous sidewall forming the box-like wheeled body 12 is hollow so as to define a storage cavity and that the lid 14 when pivoted to cover the wheeled body serves as a cover or lid for the storage compartment. Also, when the lid is closed., as shown in FIG. 2, the rigid supports 15 for the tent-like structure 13 are in a folded or nested position as shown in broken lines. One end of the support rods is pivotally carried on a pivot fixture 22 secured to the top edge of the sidewall for the body 12. The lid 14 encloses the rods so they are not exposed exteriorly of the camper. When the cover or lid 14 is raised in the direction of the arrow 23, an element 24 will engage with a fixture 25 carried on the end of a support rod 26. Such will maintain the lid in a fully opened position as will be described later. A support leg 27 is illustrated as being deployed to engage the ground in order to support the tow rod 16, as shown in broken lines. When it is intended to pull the mobile carrier from one place to another, the support leg 27 is raised to the position shown in solid lines on top of or in engagement with the tow rod 16. A conventional ball joint construction is illustrated by numeral 30 and is employed for detachably connecting the end of the tow bar 16 with the vehicle 11.

Figure 3:
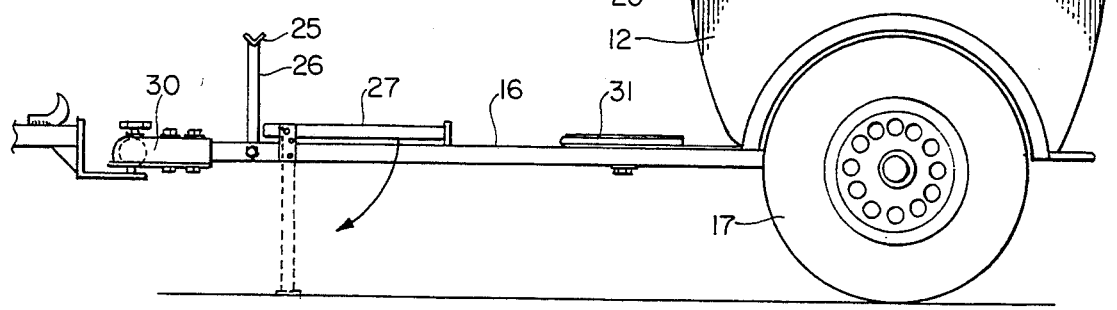
FIG. 3 is a top plan view of the foldable mobile camper shown in FIG. 2.
Figure 3:
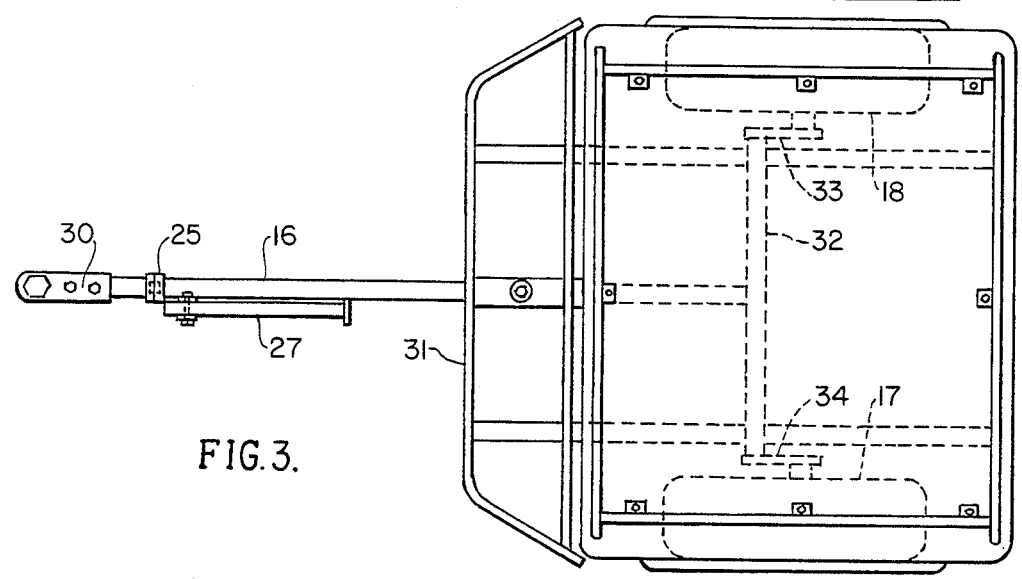

Referring now in detail to FIGS. 2 AND 3, it can be seen that the camper 10 includes an auxiliary storage rack identified by numeral 31 on which luggage or camping accessories can be strapped or otherwise attached that may be suitably carried externally of the body 12. Also, it can be seen that the wheels 17 and 18 are joined by an operable axle 32 and are connected to the wheels via torsional devices 33 and 34 respectively. The combination of axle and torsion devices may be referred to as a torflex axle and may include hubs to match the tow vehicle.

Figure 4:
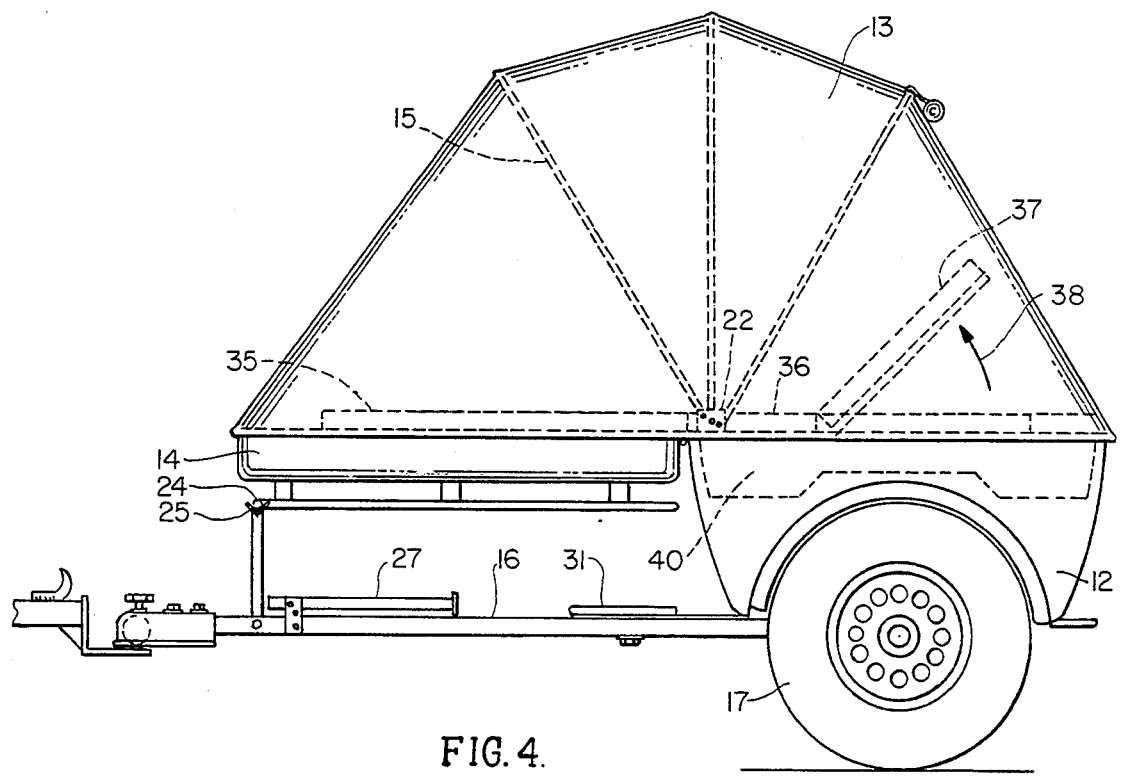
FIG. 4 is a view similar to the view of FIG. 2 illustrating the tent-like structure in its raised operative position when the lid or cover is fully pivoted.

Referring now in detail to FIG. 4, the tent-like structure 13 is illustrated as being deployed into its operable condition or position to be used as a tent. It is to be noticed that the interior of the structure 13 is occupied along the lid 14 and the body 12 by a single mattress folded to provide mattress halves, indicated by numerals 35 and 36 respectively. Mattress half 35 is associated with the lid 14 while the mattress half 36 is associated with the body 12 and the mattress half 36 is provided with a hatch 37 which, when opened in the direction of arrow 38, provides access to the storage compartment broadly indicated by numeral 40. The rigid support rods 15 are illustrated in their fully deployed position where one end of the rod is pivotally secured to the fixture 22 while the opposite ends are raised and engage the underside of the structure canvass 13 so as to tension and hold the canvass taut. It is to be understood that other materials can be employed, such as plastic, waterproof fabric or the like. When collapsed, the tent-like structure is folded under the lid, as shown in FIG. 2, and the rigid rods 15 are likewise folded upon one another in their non-operative position. In order to support the lid whereby a substantial weight can be placed on the mattress 35, the fixture 24 is received within the fixture element 25 whereby load forces are transmitted into the tow rod 16 and either distributed into the tow vehicle via the ball fixture 30 or through the support leg 27 when it is in its lowered operative position.

Figure 5:
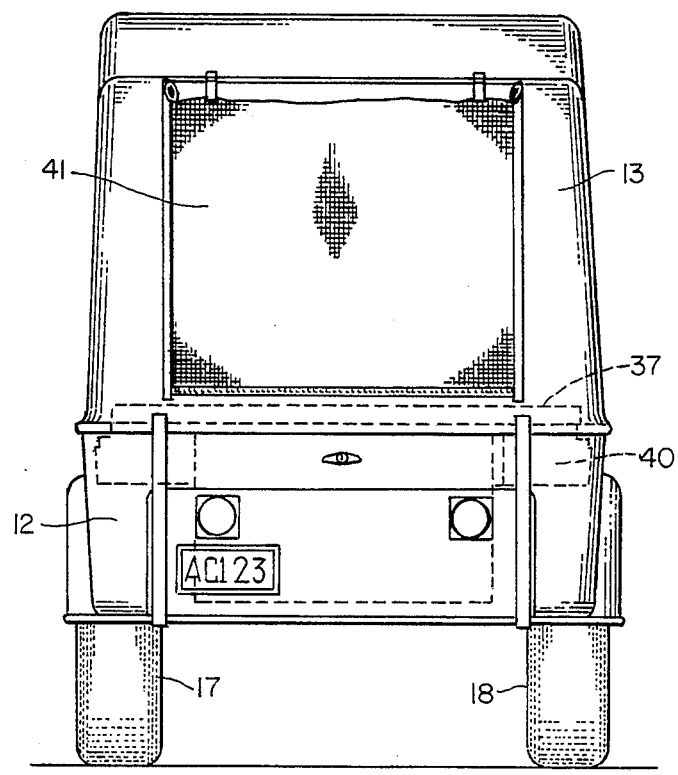
FIG. 5 is a rear view of the foldable mobile camper illustrated with the tent-like structure in its raised operative position.

In FIG. 5, it can be seen that the tent-like structure 13 includes an access door, identified by numeral 41. When it is desired to have access into the storage compartment 40, the door is Opened and then the hatch 37 may be opened so that a person inside or outside of the vehicle has access to the compartment. When the tent-like structure is in the non-operative position, as shown in FIG. 2, the lid can be partially raised so that access to the storage area is available. It can also be seen in FIGS. 4 and 5 that the lower edge marginal region of the tent-like structure is positively secured to the lid 14 and to the upper edge of the continuous sidewall of the body 12 by such means as a hook and pile fastener, bungee cords, fasteners or the like depending on whatever is suitable.

In view of the foregoing, it can be seen that the present invention includes a foldable mobile camper which may have a wheeled body composed of heavy duty white gel coat fiberglass body and lid. Plywood and honeycomb reinforcement are included and, if desired, a torflex axle may be used so as to provide progressive torque action and independent wheel movement. Heavy duty steel top rack and steel frame and rear bumpers may be utilized along with a brush guard, storage rack in front may be employed for storing motorcycles, bikes, ice chests or the like. With or without the tent-like structure being raised, the camper has over 24 cubic feet of lockable, dustproof and dry interior storage. Conventional wiring and taillights are also used along with a 2 inch ball hitch with safety chain. Both the tent-like structure and the support poles are stored in the trailer lid or cover and one person may readily fold the tent-like structure out when the lid or cover is pivoted about its hinge axis. The removable cushionhatch provides ready access to the storage compartment when the tent is being used as in its erected or operative position. The interior of the trailer may be fully carpeted and gas shocks may be employed to assist trailer top opening if desired.

In view of the foregoing, it can be seen that a new and novel foldable mobile camper is provided which is suitable for transport over rough terrain into relatively inaccessible campsite areas. The tent structure is raised to its operative position by a single person in response to pivoting of the wheeled body lid or cover.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A foldable mobile camper comprising:
   a trailer to be drawn by a motor vehicle;
   said trailer having a wheeled body with a continuous sidewall having an upper part and a lower part and defining an internal storage compartment;
   a lid hingeably attached to said body sidewall at a hinge axis and having an open position coextensive with said upper part of said body sidewall and a closed position engaging said upper part of said body sidewall to cover said storage compartment;
   a tent-like structure foldably attached to said lid and said upper part of said body sidewall deployable between a raised position when said lid is in its open position and a lowered position when said lid is in its closed position;
   a plurality of rigid support rods included in said tent-like structure pivotally attached to said upper part of said body sidewall having a pivot axis parallel to and in close proximity to said lid hinge axis;
   a mattress having one-half thereof secured to said lid and another half thereof supported by said upper part of said body sidewall with a foldable hinge line joining said mattress halves;
   said another mattress half supported by said upper part of said body sidewall includes a removable hatch providing access to said storage compartment;
   said lid includes an exterior surface and an inner surface, said mattress one-half attached to said inner surface and an accessories rack attached to said exterior surface;
   a tow bar secured to said wheeled body outwardly projecting beneath said lid when said lid is in its open position; and
   a vertical support carried on said tow bar engageable with said rack for supporting said lid in its open position.

* * * * *